US011195426B2

(12) United States Patent
Das et al.

(10) Patent No.: US 11,195,426 B2
(45) Date of Patent: Dec. 7, 2021

(54) SYSTEM AND METHOD FOR AUTOMATIC CREATION OF STEP-BY-STEP INTERACTIVE GUIDE USING WEARABLE DEVICES (71) Applicant: Robert Bosch GmbH, Stuttgart (DE)

(72) Inventors: Samarjit Das, Sewickley, PA (US); Joao Pedro De Sousa, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 498 days.

(21) Appl. No.: 16/066,598

(22) PCT Filed: Jan. 2, 2017

(86) PCT No.: PCT/EP2017/050020
§ 371 (c)(1),
(2) Date: Jun. 27, 2018

(87) PCT Pub. No.: WO2017/114968
PCT Pub. Date: Jul. 6, 2017

(65) Prior Publication Data
US 2019/0005833 A1 Jan. 3, 2019

Related U.S. Application Data (60) Provisional application No. 62/273,740, filed on Dec. 31, 2015.

(51) Int. Cl.
*G09B 5/06* (2006.01)
*G09B 19/00* (2006.01)
*G09B 19/24* (2006.01)

(52) U.S. Cl.
CPC .......... *G09B 5/065* (2013.01); *G09B 19/003* (2013.01); *G09B 19/24* (2013.01)

(58) Field of Classification Search
CPC .... G06Q 30/016; G09B 5/065; G09B 19/003; G09B 19/24
See application file for complete search history.

(56) References Cited

U.S. PATENT DOCUMENTS

2012/0158432 A1 6/2012 Jain et al.
2013/0325972 A1 12/2013 Boston et al.
(Continued)

FOREIGN PATENT DOCUMENTS

KR 10-2014-0139859 A 12/2014
WO 2015/006334 A1 1/2015
WO 2015/061508 A1 4/2015

OTHER PUBLICATIONS

International Search Report corresponding to PCT Application No. PCT/EP2017/050020, dated Mar. 24, 2017 (4 pages).
(Continued)

*Primary Examiner* — Jerry-Daryl Fletcher
(74) *Attorney, Agent, or Firm* — Maginot, Moore & Beck LLP (57) ABSTRACT A system for automatic creation of interactive step-by-step guide using wearable devices is proposed. The system includes wearable audio-visual sensors such as a first-person camera, a processor, a computer readable medium and a communication interface module to deliver interactive guidance to the users.

6 Claims, 8 Drawing Sheets (56) References Cited

U.S. PATENT DOCUMENTS

2015/0120389 A1* 4/2015 Zhang .................. G06Q 30/016
                                                    705/7.32
2015/0153906 A1* 6/2015 Liao ........................ G06F 16/78
                                                    715/709

OTHER PUBLICATIONS

Brown, Liza, How to Add Text Overlay to Video, Internet: URL:http://web.archive.org/web/20151217125435/http://filmora.wondershare.com/video-editing-tips/text-overlay.html, Dec. 17, 2015.

* cited by examiner

SYSTEM AND METHOD FOR AUTOMATIC CREATION OF STEP-BY-STEP INTERACTIVE GUIDE USING WEARABLE DEVICES

CROSS-REFERENCE TO RELATED APPLICATION

This application is a 35 U.S.C. § 371 National Stage Application of PCT/EP2017/050020, filed on Jan. 2, 2017, which claims the benefit of priority to a U.S. provisional patent application Ser. No. 62/273,740, filed Dec. 31, 2015, the contents of which are incorporated herein by reference as if fully enclosed herein.

FIELD

This disclosure relates generally to system and method for automatic creation of step-by-step interactive guide using first-person (egocentric) cameras.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure related to systems and methods for automatic creation of step-by-step interactive guide includes a wearable device (such as a first-person (egocentric) camera) and an interactive guide system. The interactive guide system includes a processor having frame extraction and speech recognition on the input to process inputs in the form of video and acoustic into an interactive guide file. The processor is also capable of retrieving key words already stored in a memory in order to process the input before the interactive guide file is assembled.

According to another exemplary embodiment of the disclosure, an interactive guide system comprises a processor for receiving data, running video frame extraction and speech recognition, and output an interactive guide file, wherein the processor comprising a natural language processing (NLP) module and a video frame extraction module, wherein the video frame extraction is run by the video frame extraction module and the speech recognition is run by the NLP module. The system further comprises a computer readable medium coupled to the processor, the processor for retrieving key words associated with the data is being stored in the computer readable medium. A client device is coupled to the processor via a communication interface module. The interactive guide file is a step-by-step guide file and comprises a set of video frames associated with instructions in text format. In one embodiment, the processor is configured to run the speed recognition using NLP module and convert data into instructions in text format.

According to another exemplary embodiment of the disclosure, a device comprises a non-transitory computer-readable medium for carrying or having computer-executable instructions to receive data from a client device, the instructions causing a machine to run video frame extraction on the data using a natural language processing (NLP) module, run speech recognition on the data using a video frame extraction module, retrieve key words associated with the data, and output an interactive guide file associated with the data. The interactive guide file is a step-by-step guide file, wherein the step-by-step guide file comprises a set of video frames associated with instructions in text format.

BRIEF DESCRIPTION OF THE DRAWINGS

These and other features, aspects, and advantages of this disclosure will become better understood when the following detailed description of certain exemplary embodiments is read with reference to the accompanying drawings in which like characters represent like arts throughout the drawings, wherein.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Figure 1:
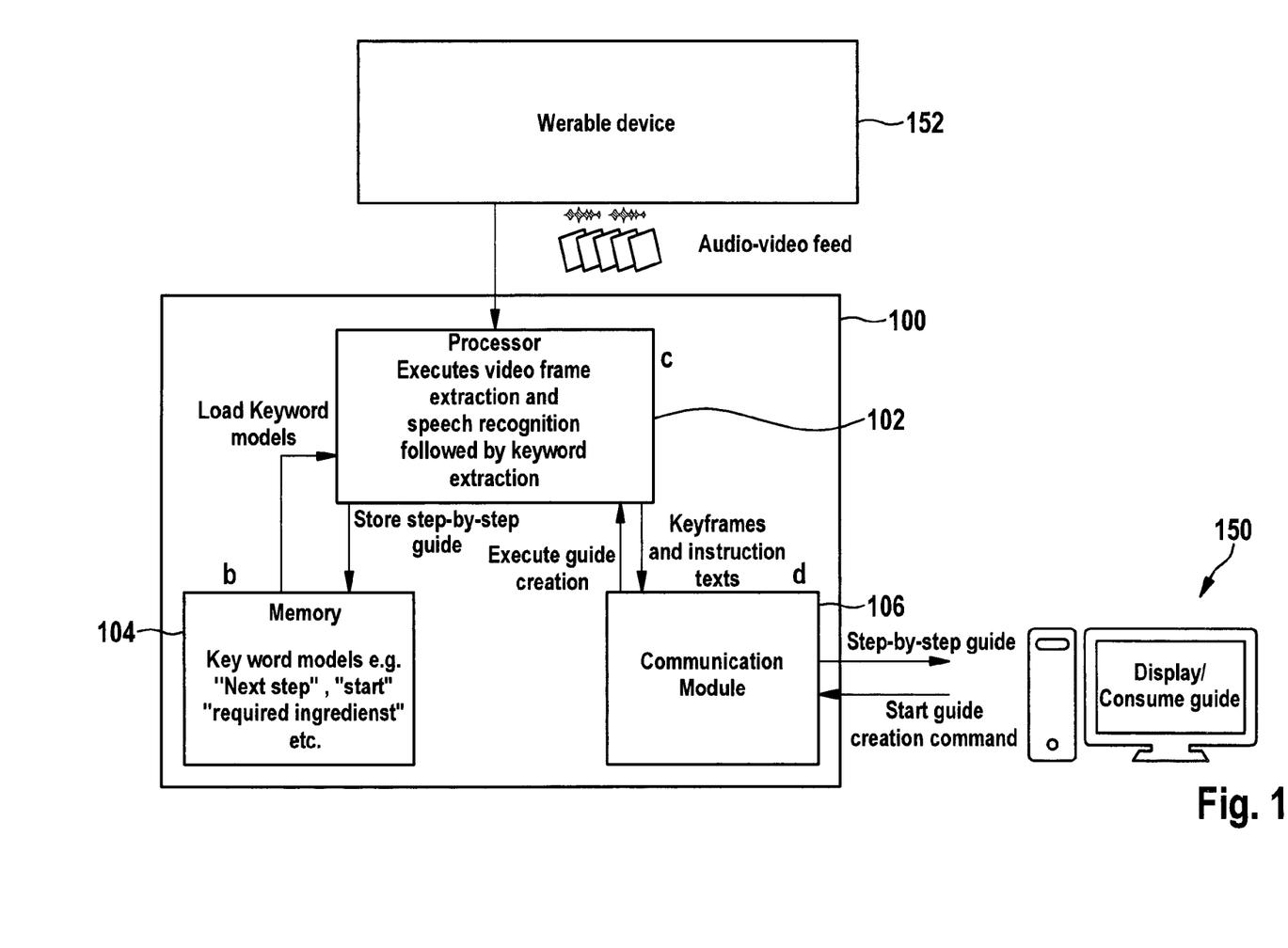
FIG. 1 is a block diagram of an exemplary embodiment of an interactive guide system coupled to a client machine in accordance to the teachings of the disclosure.

FIG. 1 is a block diagram illustrating an interactive guide system 100 coupled to a plurality of client machines, two client devices 150, 152 are illustrated. The interactive guide system 100 includes a processor 102, a computing readable medium 104, and a communication interface module 106 communicatively coupled to each other through a system bus. Communication links between client machines 150, 152 and the interactive guide system 100 may be either a wireless communication or a wired communication via the communication interface module 106. The interactive guide system 100 may be a standalone device, in some embodiments. In other embodiment, the system 100 may be integrated into any client machines 150, 152. The communication media 106 typically includes computer readable instructions, data structures, program modules, or other data in a modulated data signal such a carrier wave or other transport mechanism and include any information delivery media. Communication media 106 may also include wired media such as a wired network or direct-wired communication, and wireless media such as acoustic, RF, infrared (IR) and other wireless media. Communications of the any of the above should also be included with the scope of computer readable media. The client machine 150, 152 may be a cellular phone, a tablet, a personal digital assistant (PDA), a laptop, a wearable device, personal computer (PC), or any type of electronic devices with wireless capability. Although two client machines 150, 152 are illustrated, any number of client machines may be communicatively coupled to the interactive guide system 100. As depicted in FIG. 1, the wearable device 152 and the PC 150 are communicatively coupled to the audio system 100.

The processor 102 may be of any type, including but not limited to a microprocessor, a microcontroller, a digital signal processor, or any combination thereof. The processor 102 may include one or more levels of caching, such as a level cache memory, one or more processor cores, and registers. Depending on the desired configuration, the processor 102 may be of any type, including but not limited to a microprocessor (µP), a microcontroller (µC), a digital signal processor (DSP), or any combination thereof. The processor 102 may include one more levels of caching, such as a level cache memory, one or more processor cores, and registers. The example processor cores may (each) include an arithmetic logic unit (ALU), a floating point unit (FPU), a digital signal processing core (DSP Core), or any combination thereof. An example memory controller may also be used with the processor, or in some implementations the memory controller may be an internal part of the processor.

The computer readable medium 104 may be of any type including but not limited to volatile memory (such as RAM), non-volatile memory (such as ROM, flash memory, etc.) or any combination thereof. The memory 104 may include an operating system, a communication application, and program data. Key words models are stored in the memory with a general key word data and remain constant during operation. The key word data includes "next step", "start", "required ingredient", "stop", "pause", and any type of key word. Any words not available in the memory can be added or created and store in memory. In some embodiments, the memory 104 may include gesture models to recognize various gesture commands. The wearable device 152 includes a camera configured to capture an object in a form of video, images (either still or dynamic) and transmit the captured video to the processor 102 of the interactive guide system 100. In some embodiments, the wearable device 152 also includes a built-in microphone configured to pick up acoustic signal and transmit the signal to the processor of the interactive guide system 100. If the wearable device 152 does not equip a microphone, a standalone microphone can be coupled to the wearable device and the processor for processing. Once the processor 102 receives inputs representing both the video and acoustic, the processor 102 begins to run video frame extraction and speech recognition on the input to assemble an interactive guide file. During the execution, the processor 102 may optionally retrieve any key words stored in the memory. Once the interactive guide file is assembled, the assembled interactive guide file is then transmitted to any client machines 150, 152 for display on a display screen. Audio file, text file as subtitle, for example may be incorporated into the file.

The video frame extraction is a set of computer object code configured to process the video input and create interactive guide file frame by frame. The speech recognition is also a set of computer object code for processing language received from the microphone. The speech recognition is also referred as natural language processing model (NLP). Since the interactive guide system includes both the NLP and video frame extraction models, the processor 102 can perform audio-visual content analysis without rendering any editing. In other words, any instructions captured by the interactive guide system 100 can be read and interpreted by the client machine 150, 152 as a task flow as compared to a static unidirectional sequence.

Figure 2A:
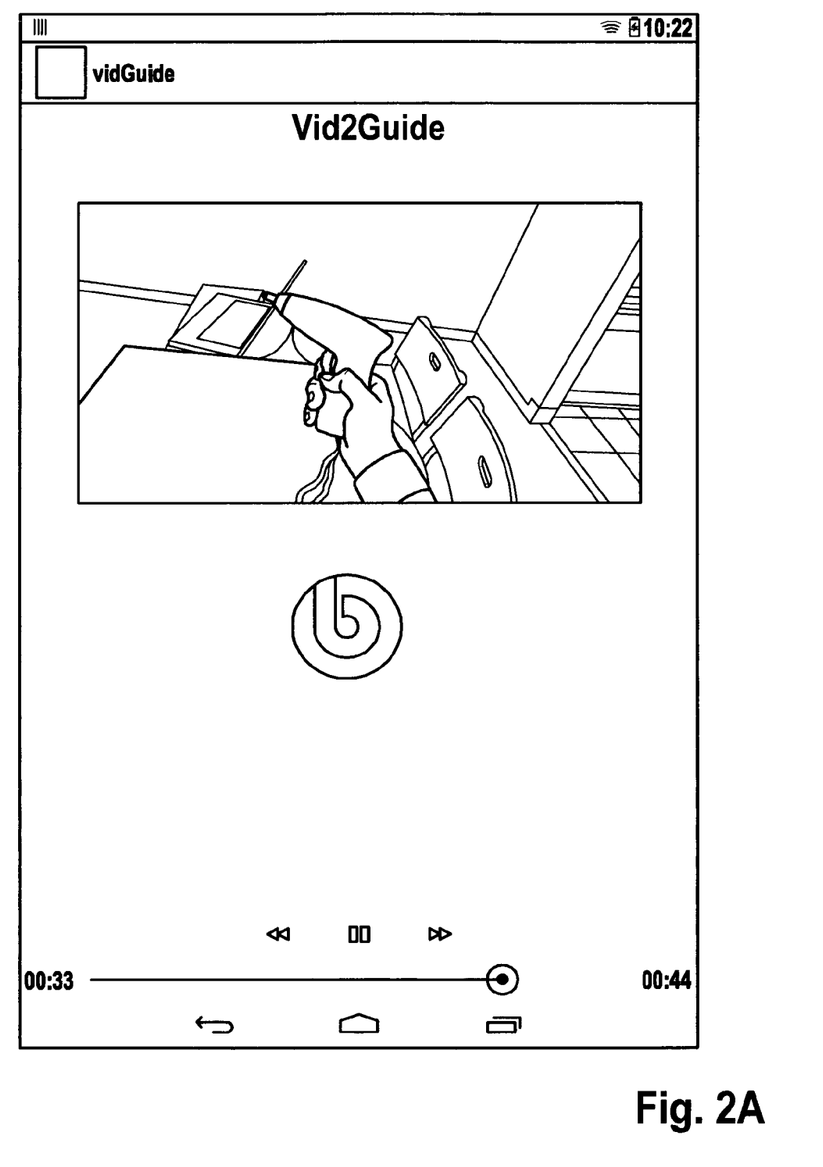
FIGS. 2A-2G are depiction of user interface displays from the interactive guide system of FIG. 1 during demonstration processor in accordance to a described embodiment of the disclosure.
Figure 2B:
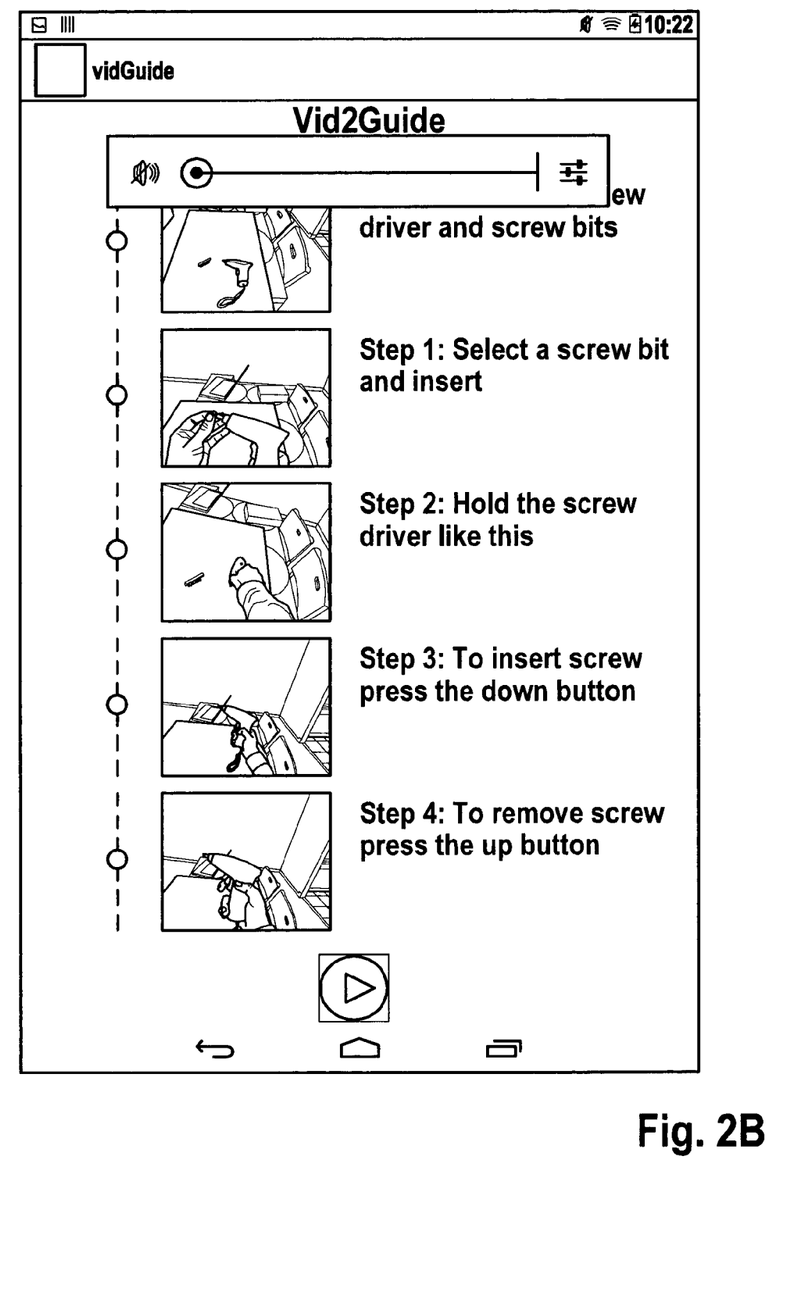
Figure 2C:
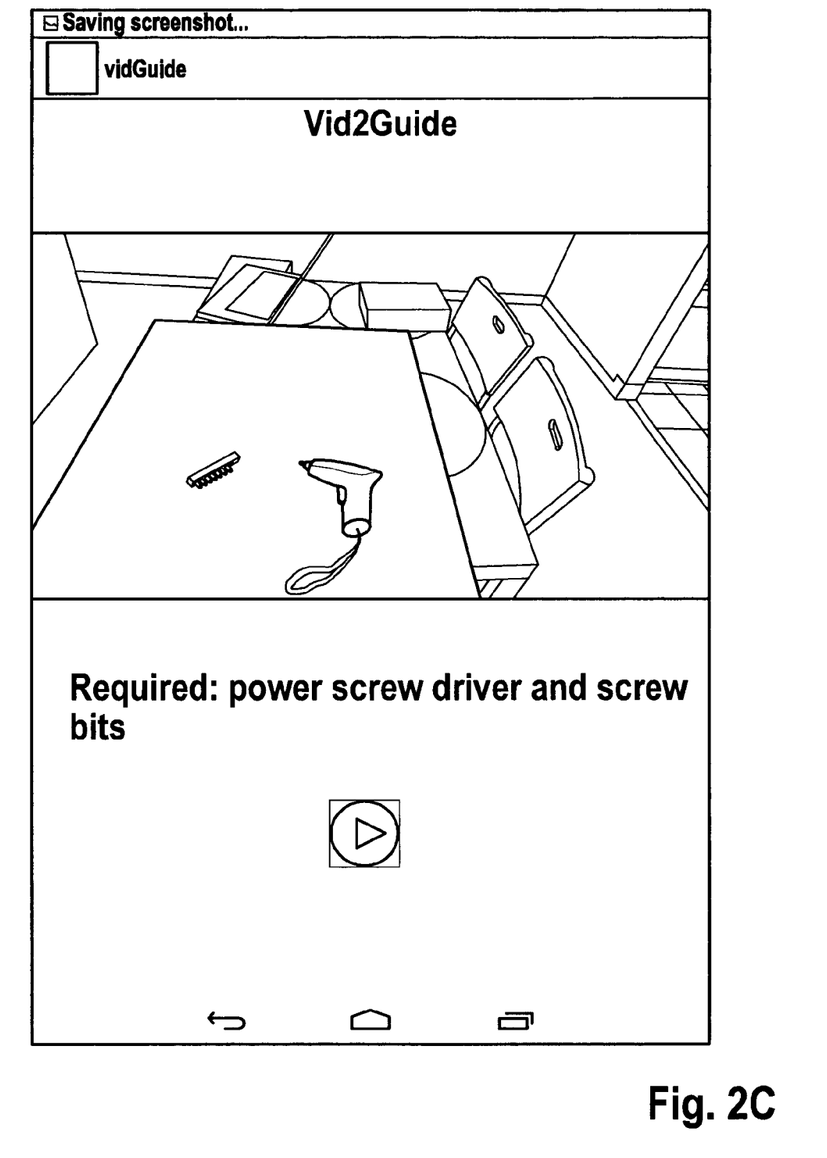
Figure 2D:
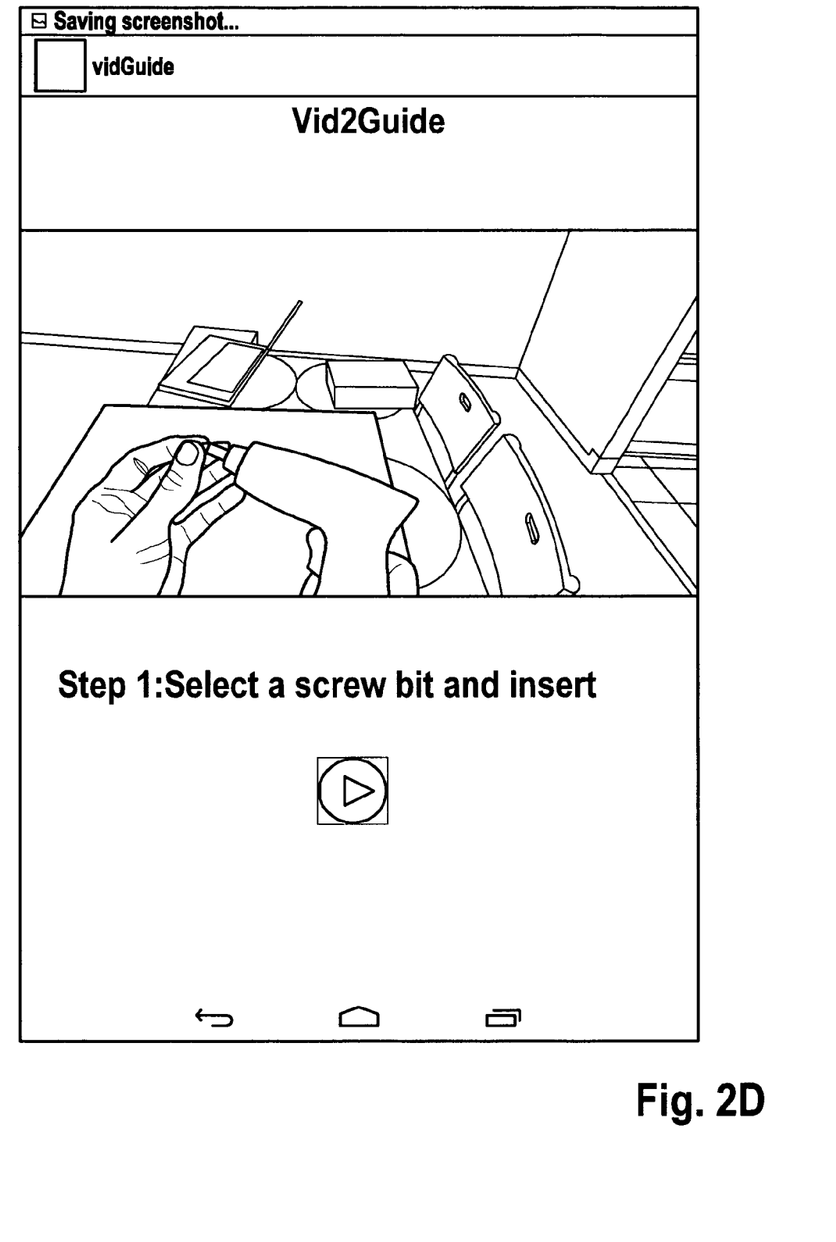
Figure 2E:
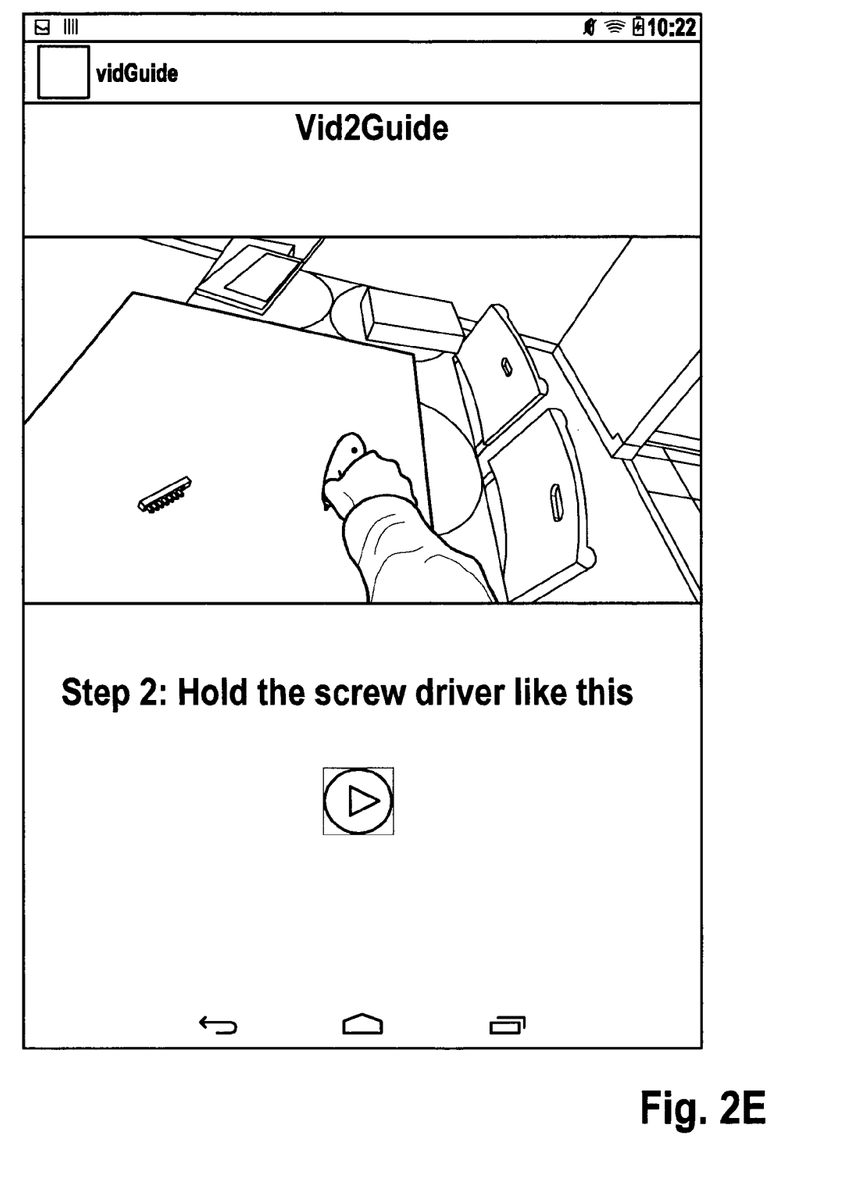
Figure 2F:
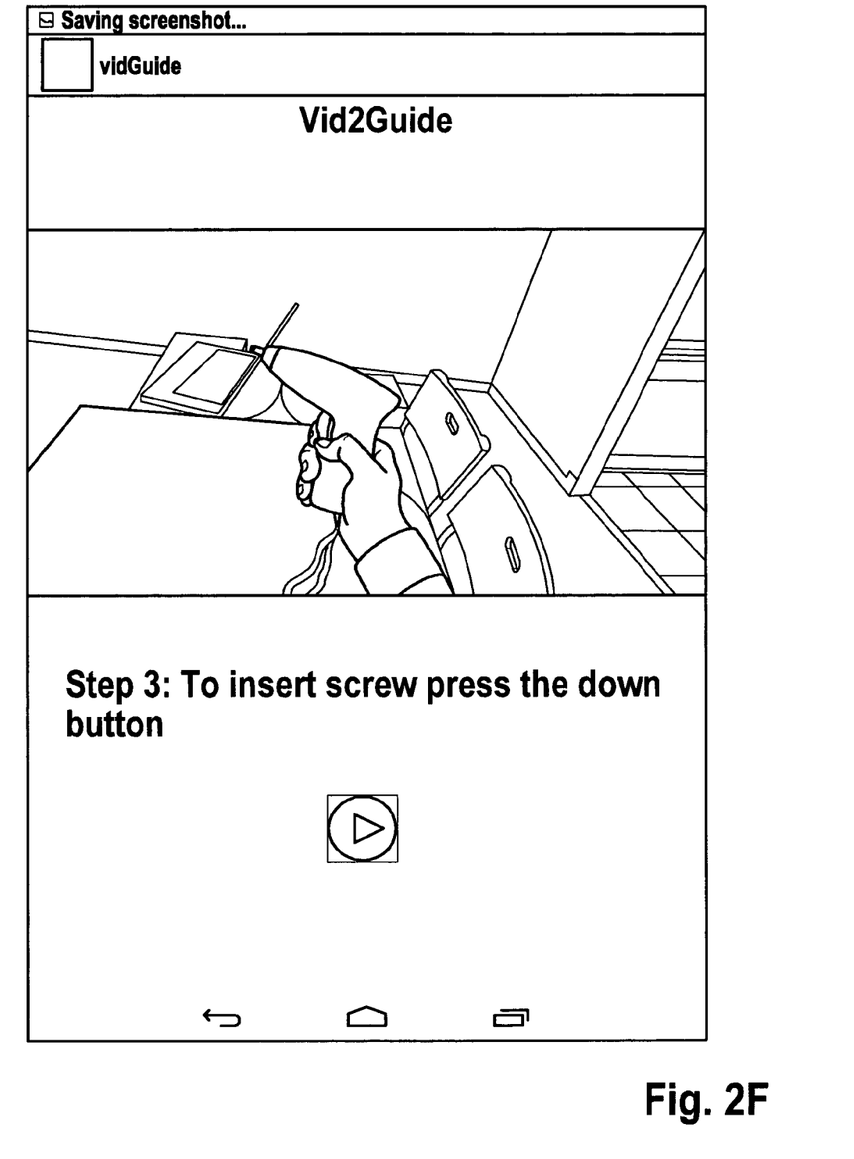
Figure 2G:
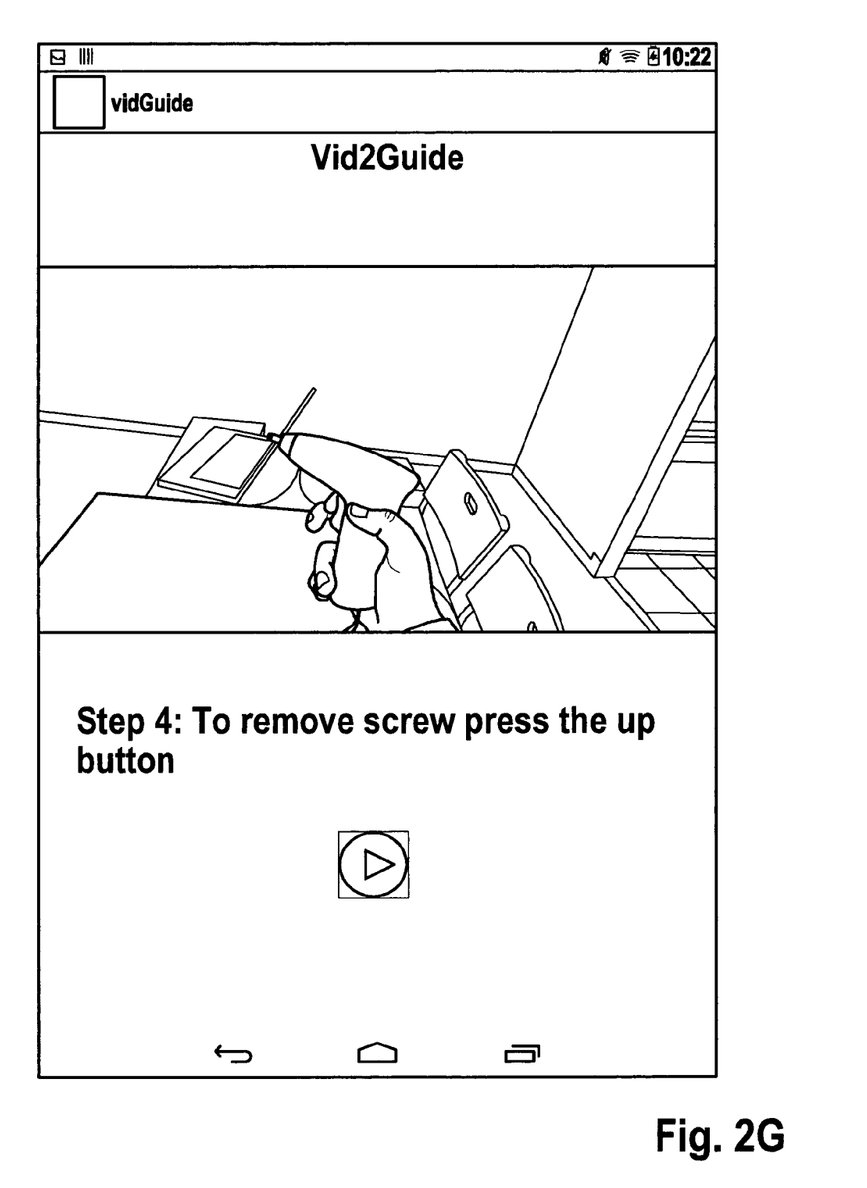

Now referring to FIGS. 2A-2G, depiction of user interface displays from the interactive guide system of FIG. 1. The user with a wearable device is paired with an interactive guide system and begins to record an object as a video. In some embodiment, the interactive guide system is integrated into the wearable device. Such case, any recording either in video or audio are detected and tracked for processing. As illustrated in FIG. 2A, a video frame is displayed on a screen of a tablet, however, any types of client machine can be used to display the frame. The video frame shows a user holding a power tool, e.g. a cordless drill. To automatically create an interactive step-by-step guide from the recorded full-length video, simply press a "create guide" button in a form of graphical user interface shown on the display screen as depicted in FIG. 2A (the big blue button with "b" in white). This action will trigger execution of instructions in the processor that will automatically convert the video into an interactive step-by-step guide file comprising of a set of video frames showing snap-shots of the key steps and their associated instructions in the form of texts. The frames and the texts are extracted from the video and audio track (spoken words/instructions) respectively. The spoken audio content in the video e.g. "step 1: select a screw bit and insert" is processed and translated into text format. The occurrence time of the keyword "step" is used to extract the corresponding video frame associated with this instruction. The processor then transmit the sentence in text format for display together with the video frame (picture) on the display screen as one of the steps in the guide file. FIG. 2B shows all the steps extracted from the whole video. In FIG. 2D the system is shown to have extracted a video frame where the user holds the screw driver and begins to insert the drill bit to the collet of the screw driver. During this stage of the video, the user continues to speak the following phrase "select a screw bit and insert". Again, the acoustic signal is translated into text for display on the display screen during the course of creating the interactive guide file. In the next segments of the video, the user held the screw driver and face downward while speaking instructions about how to hold the screw driver before use, as depicted in FIG. 2E. In the next screens, the user is shown to demonstrate how to insert and remove the screw using the screw driver that were extracted from the video. In FIG. 2F, the screen illustrates the video frame (snap-shot)/segment of the user inserting screw bit by pressing down the button on the drill driver and removing the screw bit by pressing the button upward in FIG. 2G. Similar to the previous screens (FIGS. 2D-2E), both these screens (FIGS. 2F and 2G) are automatically extracted from the video using our proposed system which relies on spotting occurrences important keywords e.g., "step" (and similar others) in the audio track and extracts corresponding video frames that are shown in the Figures. This is how, given an input video (preferably recorded with a first-person camera/wearable audio-visual sensor), our proposed system can automatically create an interactive step-by-step guide file in the form a collection of key video frames/snap-shots/images and their associated instruction texts.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the sprit and scope of this disclosure.

Embodiments within the scope of the disclosure may also include non-transitory computer-readable storage media or machine-readable medium for carrying or having computer-executable instructions or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Embodiments may also be practiced in distributed computing environments where tasks are performed by local and remote processing devices that are linked (either by hard-wired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An interactive guide system comprising:
   a processor configured to:
      receive a video captured using a camera of a first client device, the video being captured while a user performs a task with respect to an object and speaks aloud to provide step-by-step instructions for performing the task;
      extract text of the step-by-step instructions spoken by the user from the video using speech recognition;
      detect at least one keyword in the text of the step-by-step instructions;
      extract a respective image frame for each step of the step-by-step instructions based on the detection of the at least one keyword; and
      assemble, and transmit to a second client device, an interactive guide file including the text of the step-by-step instructions and the respective image frame for each step of the step-by-step instructions.

2. The interface guide system of claim 1, wherein the processor extract the text of the step-by-step instructions spoken by the user from the video using a natural language processing (NLP) technique.

3. The interactive guide system of claim 1 further comprising:
   a computer readable medium coupled to the processor and configured to store program instructions, the processor being configured to execute the program instructions to extract the text of the step-by-step instructions, detect the at least one keyword in the text of the step-by-step instructions, extract the respective image frame for each step of the step-by-step instructions, and assemble the interactive guide file.

4. The interactive guide system of claim 1, wherein the second client device is communicatively coupled to the processor via a communication interface.

5. The interactive guide system of claim 1, wherein the first client device is a wearable device having a first-person camera.

6. A device comprising:
   a non-transitory computer-readable medium that stores computer-executable instructions that, when executed by a processor, cause a processor to:
      receive a video captured using a camera of a first client device, the video being captured while a user performs a task with respect to an object and while the user speaks aloud to provide step-by-step instructions for performing the task;
      extract text of the step-by-step instructions spoken by the user from the video using speech recognition;
      detect at least one keyword in the text of the step-by-step instructions;
      extract a respective image frame for each step of the step-by-step instructions based on the detection of the at least one keyword; and
      assemble, and transmit to a second client device, an interactive guide file including the text of the step-by-step instructions and the respective image frame for each step of the step-by-step instructions.

* * * * *